Patented Jan. 18, 1944

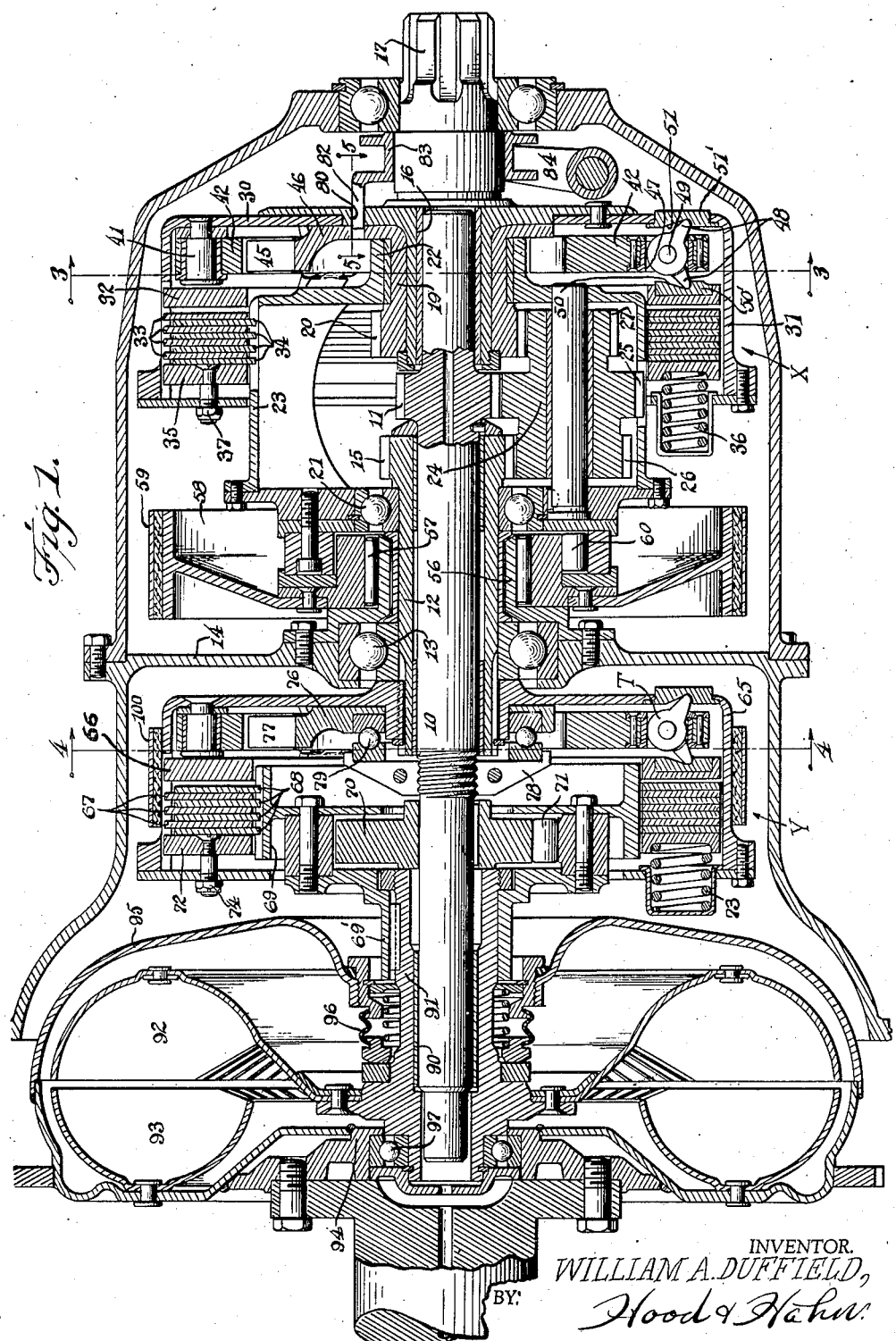

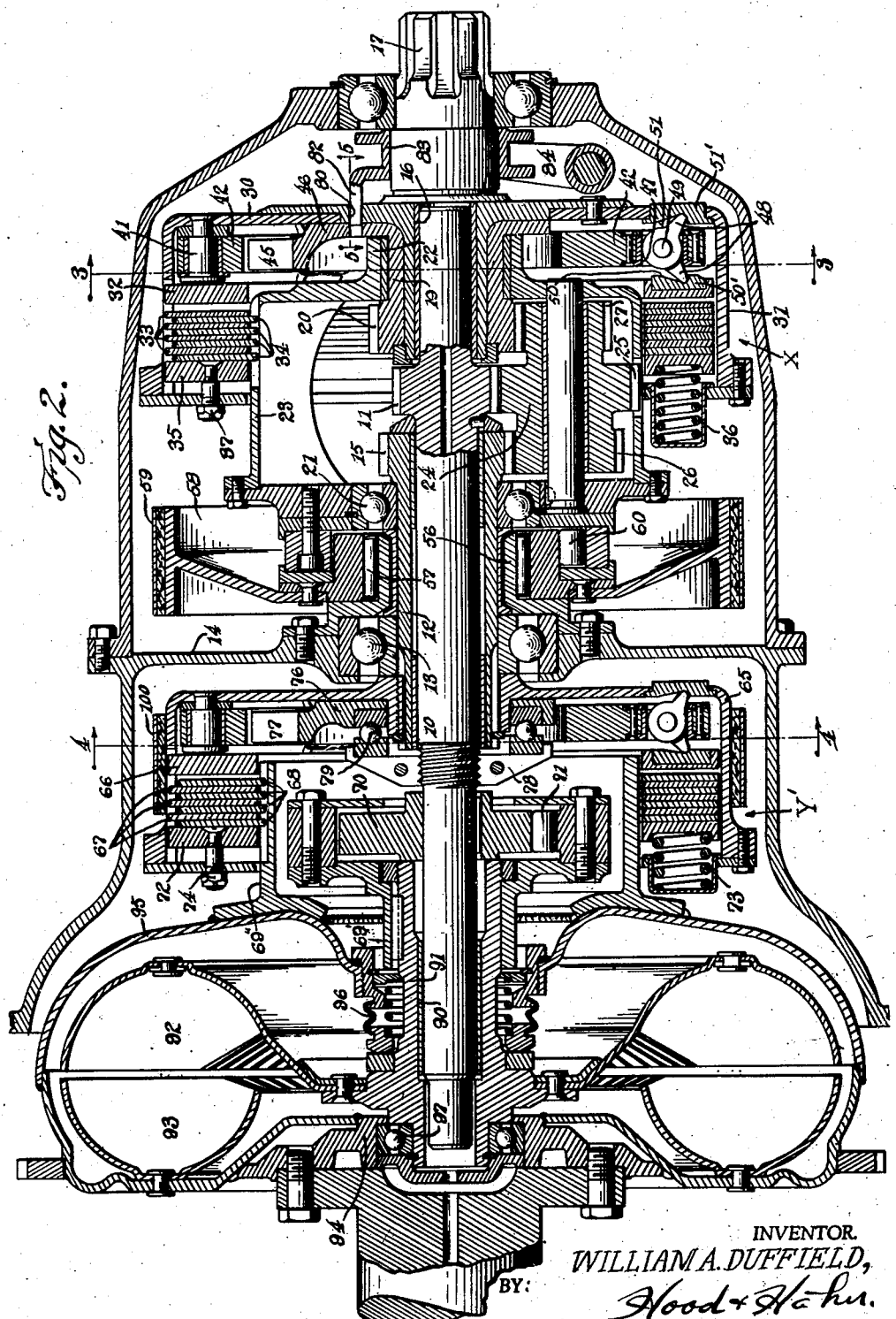

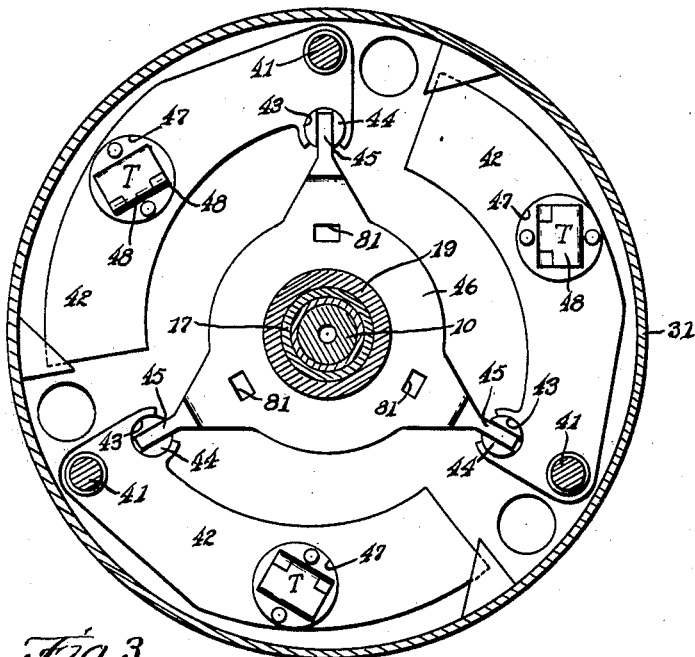

2,339,626

UNITED STATES PATENT OFFICE 2,339,626

VARIABLE SPEED TRANSMISSION

William A. Duffield, Windsor, Ontario, Canada, assignor to Windfields, Limited, Montreal, Quebec, Canada, a corporation of Canada Application March 25, 1942, Serial No. 436,158

15 Claims. (Cl. 74—189.5)

This application is in part a continuation of my pending application Serial No. 361,354, filed October 16, 1940, for Variable speed transmission.

This invention relates to a mechanism for the transmission of power from a prime mover to a delivery shaft at variable speeds in such manner that the shifts from one speed ratio to another are entirely automatic in accordance with the relation between the prime mover torque and the delivery shaft torque.

The mechanism includes a liquid coupling mechanism which cooperates with the gearing in a novel manner.

The primary object of the invention is to provide a speed change transmission gearing which will meet the varied requirements of load, speed and torque, particularly in the operation of motor vehicles.

A further object of the invention is to provide a transmission in which the changes of speed and torque are not manually controlled but are automatic and are subject to the control of power supplied to the transmission and the resistance of the load at any load speed.

The accompanying drawings illustrate my invention:

Fig. 1 is an axial section of one embodiment of my invention;

Fig. 2 an axial section of another embodiment of my invention;

Fig. 3 a section, on a smaller scale, on line 3—3 of Figs. 1 and 2;

Fig. 4 a section, on the scale of Fig. 3, on line 4—4 of Figs. 1 and 2;

Fig. 5 a fragmentary section on line 5—5 of Figs. 1 and 2; and

Fig. 6 a fragmentary section showing the means for normally urging the speed-sensitive clutch elements to low speed position.

In the drawings 10 indicates the main shaft of the transmission and this shaft is provided with a sun gear 11. Journalled upon shaft 10 is a tubular shaft 12 which is supported in a bearing 13 supported by the stationary end wall 14. Shaft 12 carries a sun gear 15 which flanks gear 11. The outer end of shaft 10 is journalled in an axial pocket 16 formed in the inner end of tail shaft 17 which, at its outer end, is splined or otherwise formed to receive a coupling which is to be connected to the load. Journalled on the inner end of tail shaft 17 is a tubular shaft 19 provided, at its inner end, with a sun gear 20 which flanks gear 11 on the side opposite to gear 15.

Journalled on the two tubular shafts 12 and 19, through the medium of a bearing 21 and sleeve 22 respectively, is a planetary gear carrier 23 within which is journalled a planetary group 24 comprising a gear 25 meshing with gear 11, a gear 26 meshing with gear 15, and a gear 27 meshing with gear 20, in the embodiment shown gear 11 being smaller than gear 15, gear 15 being smaller than gear 20, and gears 25, 26 and 27 of the planetary group being appropriately dimensioned so as to be in simultaneous engagement with the sun gears.

Connected to, or formed integrally with, tail shaft 17 is a flange 30 to which is attached, or which forms part of, a clutch housing 31 within which is splined a pressure ring 32 and a plurality of friction rings 33 interdigitated with a plurality of friction rings 34 splined upon carrier 23. Flanking the group of friction rings 33—34 is a pressure ring 35 which is splined on clutch housing 31 and yieldingly urged toward the friction rings 33 by springs 36, the action of which is limited by adjusting bolts 37. Pressure ring 32 is yieldingly urged away from the adjacent friction ring group by retrieving springs 38.

In the interior of the clutch housing 31, which, as noted above, is connected to the tail shaft for rotation therewith, is a series of pins 41 upon each of which is pivoted a centrifugally sensitive weight 42 conveniently in the form of a bell crank lever, the long arm of which is appropriately weighted and the short arm of which is provided with a cylindrical pocket 43 within which is journalled a bushing 44 which is diametrically slotted to receive an arm 45 projecting radially from a ring 46 formed integrally with, or attached to, tubular shaft 19.

The weighted arm of each of the elements 42 is provided with a perforation or pocket 47 within which is located a toggle structure T composed of two members 48—48 pivotally connected by a pivot pin 49 and each provided with a toe, one of which rests in a pocket 50 in the pressure ring 32 and the other of which rests in a pocket 51 of the housing 31. Pockets 50 and 51 may be formed in blocks 50' and 51' respectively which are rotatively mounted in housing 31 and pressure ring 32 respectively, as indicated in Figs. 1 and 2.

The arrangement is such that when the weighted end of the centrifugally sensitive element 42 moves outwardly under the action of centrifugal force, the toggle structure will be expanded between housing 31 and pressure ring 32 to force said pressure ring 32 toward pressure ring 35 and the interposed friction rings so as to activate the clutch and thereby connect housing 31 and tail shaft 17 with the carrier 23. The parts are so proportioned that, when weights 42 are in their outermost position, the expanded toggle structure lies short of a dead center position so that the retrieving springs 38, acting through the pressure ring 32 thereon, will act to return weights 42 to their inner positions whenever centrifugal forces acting upon said weights are sufficiently decreased.

The teeth of gears 11 and 25 are helical and so pitched that forward driving torque exerted upon the tail shaft will urge shaft 10 axially to the right, for a purpose which will be made to appear.

Attached to end wall 14 is a sleeve 56 through which tubular shaft 12 projects and which supports bearing 57 upon which is journalled a brake drum 58 which may be held stationary by manually operated brake 59. Interposed between the hub of drum 58 and carrier 23 is a one-way clutch 60 which will prevent reverse rotation of carrier 23 when drum 58 is held stationary.

Splined upon tubular shaft 12 and abutting bearing 13 is a clutch housing 65 within which is splined a pressure ring 66 and a plurality of friction discs 67 interdigitated with friction discs 68 splined upon a drum 69 carried by a collar 69' within which is a collar 70 keyed to shaft 10. Interposed between collar 69' and collar 70 is a one-way clutch 71 which permits driving torque to be applied to the shaft 10 through the medium of collar 69' only in the forward direction. Flanking the friction ring group 67—68 is a pressure ring 72 abutted by springs 73, like springs 36, and limited in movement in one direction by the adjusting bolts and nuts 74, like bolts 37.

Pressure ring 66 is urged away from the friction ring group 67—68 by retrieving springs like springs 38. Pivotally supported in housing 65 are centrifugally sensitive weights 75, like weights 42, and carrying toggle mechanisms T, like the toggle mechanisms previously described.

Rotatively mounted on the hub of casing 65 is an equalizer ring 76 provided with radial arms 77 extending into the short arms of weights 75. Secured to shaft 10 is an axially adjustable collar 78 between which, and ring 76, is interposed a thrust bearing 79, the arrangement being such that when shaft 10 is urged to the right by reason of the interaction of the helical teeth of gears 11 and 25, pressure will be exerted upon the equalizer ring 76 to oppose rotative movement thereof under the influence of centrifugal forces acting on the speed-sensitive element 75 in accordance with the differential between driving torque applied to the shaft 10 and load torque applied to the tail shaft. By this means outward movement of weights 75, under applied centrifugal forces, is dependent upon the differential between driving torque applied to gear 11 and load torque applied to the tail shaft.

Projecting through perforations 80 in part 30 or 31 and into perforations 81 in ring 46 are fingers 82 carried by a collar 83 axially shiftable on the tail shaft and manually movable through the medium of an operating arm 84. The free ends of fingers 82 are shouldered at 85 in such manner that, when in their normal retracted position as shown in Figs. 1 and 2, said fingers will not interfere with the necessary angular movement of ring 46 relative to housing 31, but when fully projected (toward the left Figs. 1 and 2) into perforations 81, will lock ring 46 against rotation relative to housing 31 and thereby prevent outward movement of elements 42 in response to centrifugal forces applied thereto.

One end of shaft 10 is journalled within an axial pocket 90 formed in the hub 91 of the runner 92 of a liquid coupling which also comprises an associated impeller 93 attachable at 94 to a source of power and provided with a shell 95 which encloses the runner 92 with a liquid seal 96 interposed between said shell and the hub of runner 92. Impeller 93 and runner 92 are correlated by bearing 97. This liquid coupling is of a well known type, commonly referred to as a "Fottinger" type, the impeller and runner being provided with radiating vanes forming channels in the impeller and runner through which the contained liquid may be circulated, upon rotation of the impeller. Clutch housing 65 is so formed as to function as a brake drum which may be held stationary by manually operated brake 100.

The mechanism shown in Fig. 2 is, except for the manner of mounting of the drum carrier for the inner set of interdigitated friction rings 68, the same as shown in Fig. 1. In the construction in Fig. 2 the friction rings 68 are keyed to an annulus 69" which is secured to shell 95 which is carried by the impeller 93 of the liquid coupling.

For convenience in description of operation the clutch assembly which is controlled by the speed-sensitive elements 42 will be referred to as clutch X and the clutch assembly which is controlled by the speed-sensitive elements 75 will be referred to as clutch Y.

Operation of the apparatus shown in Fig. 1 is as follows: Rotation of impeller 93 will cause rotation of runner 92 through the medium of the enclosed liquid. Runner 92, through the medium of the one-way clutch 71, will rotate shaft 10, the initial torque, by reason of the helical teeth of gears 11 and 25, serving to press collar 78 against bearing 79 on to equalizer ring 76 thereby resisting outward movement of a speed-sensitive element 75 in accordance with the differential between engine torque and load torque.

Rotation of gear 11 causes rotation of the planetary unit 24 and, as reverse rotation of carrier 23 is prevented by clutch 60, because 58 is held stationary by brake band 59, gear 27 will rotate gear 20 in a forward direction. The gear 20, acting through ring 46 and fingers 45 upon weights 42, urges said weights to their innermost position and exerts a circumferential driving force on carrier 31 through pins 41 to rotate tail shaft 17 forwardly at a gear ratio determined by that of the gears 11—25—27—20. At the same time, gear 15 is rotated in a forward direction by gear 26 but at a less speed than that of the gear 20 and the tail shaft, and the load torque acting through the helical gears 11 and 25 exerts a proportional resistance on equalizer ring 76. In course of time, however, the centrifugal forces acting on element 75 become sufficient to overcome the resistance to movement of equalizer 76 and the weights move outwardly to cause toggle T of clutch Y to initiate activation of that clutch thereby transmitting the driving torque from runner 92 to tubular shaft 12 and gear 15 so that flow of power is then partially from runner 92 through clutch Y, tubular shaft 12, gear 15, gear 26, gear 27, gear 20, and housing 31 to the tail shaft, gear 25 thereby operating on gear 11 not only to drive shaft 10 so that it will underrun collar 69' by reason of clutch 71 but also to relieve pressure on equalizer ring 76 so that weights 75 may move outwardly to fully activate clutch Y. This is an approach to complete second gear relationship.

The amount of restraining pressure exerted on equalizer ring 76 will vary with the torque of the load impressed on the tail shaft. Consequently, the speed of carrier 65 at which weights 75 will move outwardly to activate clutch Y will be dependent upon and determined by the relation between the input torque imposed on shaft 10 and the load torque imposed on the tail shaft. Whenever the load torque has sufficiently diminished, relative to the input torque on shaft 10 to realize ring 76, clutch Y will be fully activated by further outward movement of weights 75 and the driving effort will be entirely through the second speed train 92, 69', Y, 12, 15, 26, 27, 20, 46, 45, 42, 41, 31, 30, 17.

If, for any reason, whether it be increased load torque or decreased engine torque, the speed of carrier 65 decreases to a predetermined point, dependent on the centrifugal value of weights 75 unaffected by load torque, clutch Y will be released by inward movement of weights 75 and low gear relation will be automatically reestablished. This is due to the fact that the retriever springs, acting through the pressure ring 66 on the toggle T of the clutch Y, will restore the weights 75 to their inner positions whenever the centrifugal forces acting on weights 75 are sufficiently diminished.

If, on the other hand, load torque sufficiently decreases relative to engine torque to permit clutch X to be brought into action by weight 42, carrier 23 will start forwardly so that overrunning of shaft 10 relative to clutch 70 is gradually diminished as the speed of carrier 23 increases until the ratio between the gears 15, 26, 25, 11 is compensated, whereupon the rotative speeds of 10—11 and 15 are equal and runner 92 resumes driving effort on shaft 10 through the medium of clutch 71. At this instant the resistance to further outward movement of weights 42 is measured by the relation between the instant load torque and the instant engine torque arriving at gear 20 through the low gear train and consequently further outward movement of weights 42, to make clutch X fully effective, will depend on this torque relation and, so long as the speed of clutch Y remains above the critical speed previously mentioned, engine torque will be applied by runner 92 to both gears 11 and 15.

It will be noticed that, in the high speed relationship, engine torque is not transmitted to the tail shaft through carrier 23 but through the differential gearing, through without speed reduction through that gearing. This because carrier 23, in high speed, is clutched to the tail shaft and therefore only subjected to a torque which is the difference between engine torque as it arrives at gear 20 and load torque applied to gear 20.

In high speed relation, when clutch X is fully activated, so long as the speed of carrier 65 is above critical speed, runner 92 (Fig. 1) transmits engine torque to both gears 11 and 15 but if load speed drops to the critical release speed of clutch Y without a sufficient increase of load torque to act through helical gear 11 and collar 78 on equalizer 76, weights 75 will move inwardly to disconnect clutch Y so that the engine torque to the tail shaft will be through the low speed train 11—25—27—20 though at engine speed until clutch X is released due to a sufficient differential between engine torque and load torque.

When the load torque sufficiently increases to cause release of clutch X the drive will be at a speed less than engine speed either through the second speed train 15—26—27—20 or the low speed train 11—25—27—20 depending upon the speed of carrier 65 at that moment.

For reverse, carrier 65 is held stationary by brake 100, drum 58 is released from brake 59 and fingers 82 are projected into ring 48 so as to block outward movement of weights 42. The flow of power is then from the impeller 93 through 92, 69', 71, 70, 10, 11, 25 causing 26 to roll on stationary gear 15 and thereby revolve 27 around and rotate relative to gear 20 so as to rotate gear 20 and the tail shaft in reverse direction.

Analogous conditions exist in the form shown in Fig. 2, except that activation of clutch y', corresponding to clutch Y in the other form, connects the second speed gear 15 with the impeller 93 instead of with the runner 92 and consequently, in second gear, cuts out the usual slippage which exists between impeller 93 and runner 92. In this form, as well as in the form shown in Fig. 1, the shifts in the lines of flow of power from the engine to the tail shaft are entirely automatic and the driving torque is always through the differential gearing even in the high speed relationship.

It will, of course, be understood that the one-way clutches 60 and 71 may be of any desired form and that the means for holding drum 58 and clutch shell 65 against rotation may be other than the friction band brakes shown.

The clutches X and Y must be of such character as to permit relative rotation between their input and output ends during an initial period of activation and the term "friction clutch" used in the specification and claims is to be so interpreted.

Between the several sun gears there must be speed differentials dependent upon a planetary unit and the most convenient gear relation is of the character indicated in the drawings and description in terms of relative sizes of the sun gears, but it is to be understood that other size relations of the epicyclic gearing performing comparable functions would be within the limits defined by such phraseology.

I claim as my invention:

1. A speed change gearing comprising, a first sun gear, a second sun gear of larger diameter than the first sun gear, a third sun gear of larger diameter than the first sun gear, an integrated group of planetary gears meshing with said sun gears, a carrier for said planetary group rotatable about the axis of the sun gears, means obstructing rotation in one direction only of said carrier, a liquid coupling comprising a power-receiving element and a power-delivery element, a one-way driving connection between said power-delivery element of the coupling and the first sun gear, a speed-sensitive element revolvable about the axis of the sun gears, a carrier for said speed-sensitive element rotatable about the axis of the sun gears, a friction clutch interposed between said last-mentioned carrier and the first-mentioned carrier and operated by said speed-sensitive element in its clutch-activating position to clutch said two carriers together, a connection between the third sun gear and the speed-sensitive element acting to restrain clutch-activating movement of the speed-sensitive element in accordance with the relation of input torque applied to the third sun gear and load torque applied to the carrier of the speed-sensitive element, a second speed-sensitive element revolvable about the axis of the sun gears, a carrier for said second-speed-sensitive element rotatable about the axis of the sun gears and connected to the second sun gear, a friction clutch interposed between said carrier of the second-speed-sensitive element and one of the elements of the fluid coupling, and a tail shaft connected with said second-mentioned carrier.

2. A speed change gearing comprising, a first sun gear, a second sun gear of larger diameter than the first sun gear, a third sun gear of larger diameter than the first sun gear, an integrated group of planetary gears meshing with said sun gears, a carrier for said planetary group rotatable about the axis of the sun gears, means obstructing rotation in one direction only of said carrier, a liquid coupling comprising a power-receiving element and a power-delivery element, a one-way driving connection between said power-delivery element of the coupling and the first sun gear, a speed-sensitive element revolvable about the axis of the sun gears, a carrier for said speed-sensitive element rotatable about the axis of the sun gears, a friction clutch interposed between said last-mentioned carrier and the first-mentioned carrier and operated by said speed-sensitive element in its clutch-activating position to clutch said two carriers together, a connection between the third sun gear and the speed-sensitive element acting to restrain clutch-activating movement of the speed-sensitive element in accordance with the relation of input torque applied to the third sun gear and load torque applied to the carrier of the speed-sensitive element, a second speed-sensitive element revolvable about the axis of the sun gears, a carrier for said second speed-sensitive element rotatable about the axis of the sun gears and connected to the second sun gear, a friction clutch interposed between said carrier of the second speed-sensitive element and the input element of the fluid coupling, and a tail shaft connected with said second-mentioned carrier.

3. A speed change gearing comprising a first sun gear, a second sun gear of larger diameter than the first sun gear, a third sun gear of larger diameter than the first sun gear, an integrated group of planetary gears meshing with said sun gears, a carrier for said planetary group rotatable about the axis of the sun gears, means obstructing rotation in one direction only of said carrier, a liquid coupling comprising a power-receiving element and a power-delivery element, a one-way driving connection between said power-delivery element of the coupling and the first sun gear, a speed-sensitive element revolvable about the axis of the sun gears, a carrier for said speed-sensitive element rotatable about the axis of the sun gears, a friction clutch interposed between said last-mentioned carrier and the first-mentioned carrier and operated by said speed-sensitive element in its clutch-activating position to clutch said two carriers together, a connection between the third sun gear and the speed-sensitive element acting to restrain clutch-activating movement of the speed-sensitive element in accordance with the relation of input torque applied to the third sun gear and load torque applied to the carrier of the speed-sensitive element, a second speed-sensitive element revolvable about the axis of the sun gears, a carrier for said second speed-sensitive element rotatable about the axis of the sun gears and connected to the second sun gear, a friction clutch interposed between said carrier of the second speed-sensitive element and the output element of the fluid coupling, and a tail shaft connected with said second-mentioned carrier.

4. Apparatus of the character specified in claim 1 and including means by which the second sun gear may be held stationary.

5. Apparatus of the character specified in claim 2, and including means by which the second sun gear may be held stationary.

6. Apparatus of the character specified in claim 3, and including means by which the second sun gear may be held stationary.

7. Apparatus of the character specified in claim 1 and including means by which the second sun gear may be held stationary and means for locking the third sun gear upon the tail shaft.

8. Apparatus of the character specified in claim 2, and including means by which the second sun gear may be held stationary and means for locking the third sun gear upon the tail shaft.

9. Apparatus of the character specified in claim 3, and including means by which the second sun gear may be held stationary and means for locking the third sun gear upon the tail shaft.

10. A speed change gearing comprising, a first sun gear, a second sun gear of larger diameter than the first sun gear, a third sun gear of larger diameter than the first sun gear, an integrated group of planetary gears meshing with said sun gears, a carrier for said planetary group rotatable about the axis of the sun gears, means obstructing rotation in one direction only of said carrier, means including a one-way clutch by which power may be applied to the first sun gear, means including a clutch by which power may be applied to the second sun gear independent of application of power to the first sun gear, a tail shaft, a friction clutch interposed between said carrier and the tail shaft, a speed-sensitive actuator for said clutch, means responsive to the differential between input torque and load torque applied to the third sun gear for restraining clutch-activating movement of the actuator of the clutch leading to the second sun gear, and a speed-sensitive actuator for the clutch of the power applying means for the second sun gear.

11. Apparatus of the character specified in claim 10, and including means interposed between the third sun gear and the first-mentioned speed-sensitive actuator to restrain response of said actuator to speed in accordance with load torque applied to the tail shaft.

12. Apparatus of the character specified in claim 10, and including means for holding the second sun gear stationary and means for blocking operation of the first-mentioned clutch.

13. Apparatus of the character specified in claim 10, and including means interposed between the third sun gear and the first-mentioned speed sensitive actuator to restrain response of said actuator to speed in accordance with load torque, means for holding the second sun gear stationary, and means for blocking operation of the first-mentioned clutch.

14. A speed change transmission comprising, an epicyclic gearing group comprising two relatively-rotatable input gears, an output gear, connecting planetary gears, a rotary carrier for said planetary gears, and a tail shaft; a friction clutch for connecting said carrier and tail shaft, a speed-sensitive actuator for said clutch, a torque-sensitive control for said actuator, means including an overrunning clutch by which power may be applied to one of said input gears, means including a clutch by which power may be applied to the other of said input gears, a speed-sensitive actuator for said last-mentioned clutch, and torque-sensitive control means operative on said last-mentioned actuator in clutch-activating direction only.

15. In an automatic variable speed transmission, a torque control governor comprising, a main shaft having a helical pinion meshing with a planetary gear, an adjustable nut on the main shaft, a thrust bearing, a clutch carrying pivoting slotted governor weights, a clutch carrier having cam surfaces, and a control spider between the thrust bearing and cam surfaces on the carrier, having spider arms bearing in slots in the weights.

WILLIAM A. DUFFIELD.